Oct. 26, 1948.

K. B. HOLSTEBROE ET AL 2,452,376

BOTTLE PACKING MACHINE

Filed Nov. 4, 1942

INVENTORS
Kaye B. Holstebroe and
Ludwig Wimmer
BY
Pennie, Davis, Marvin and Edmonds
THEIR ATTORNEYS Oct. 26, 1948.  K. B. HOLSTEBROE ET AL  2,452,376
BOTTLE PACKING MACHINE
Filed Nov. 4, 1942  11 Sheets-Sheet 7

INVENTORS
Kaye B. Holstebroe and
Ludwig Wimmer
BY
Pennie, Davis, Marvin and Edmonds
THEIR ATTORNEYS Oct. 26, 1948.  K. B. HOLSTEBROE ET AL  2,452,376
BOTTLE PACKING MACHINE
Filed Nov. 4, 1942  11 Sheets-Sheet 8

INVENTORS
Kaye B. Holstebroe and
Ludwig Wimmer
BY
Pennie, Davis, Marvin & Edmonds
THEIR ATTORNEYS Oct. 26, 1948.  K. B. HOLSTEBROE ET AL  2,452,376
BOTTLE PACKING MACHINE Filed Nov. 4, 1942  11 Sheets-Sheet 9

INVENTORS
Kaye B. Holstebroe and
Ludwig Wimmer
BY
Pennie, Davis, Marvin and Edmonds
THEIR ATTORNEYS

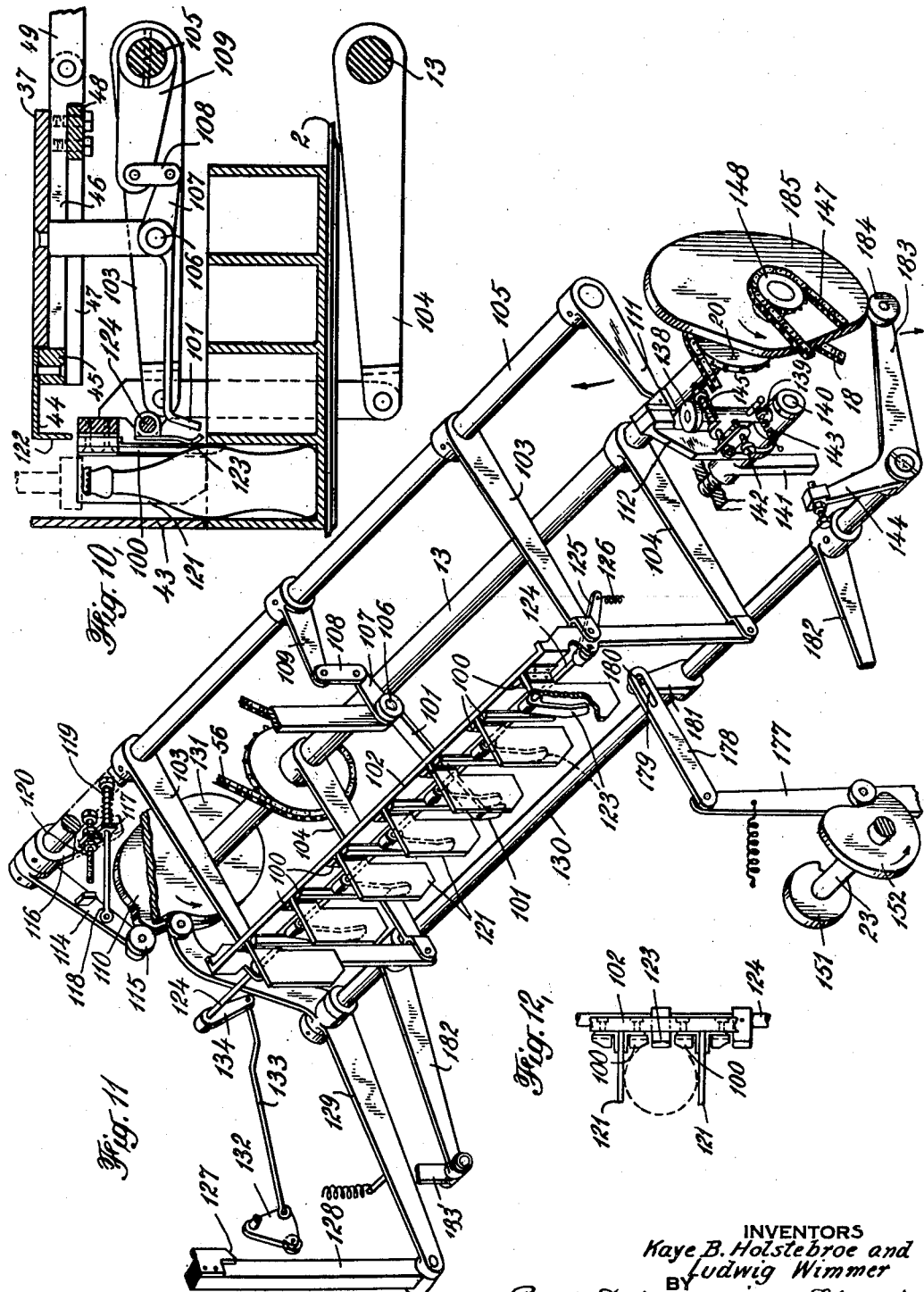

Oct. 26, 1948.  K. B. HOLSTEBROE ET AL  2,452,376
BOTTLE PACKING MACHINE
Filed Nov. 4, 1942    11 Sheets-Sheet 11
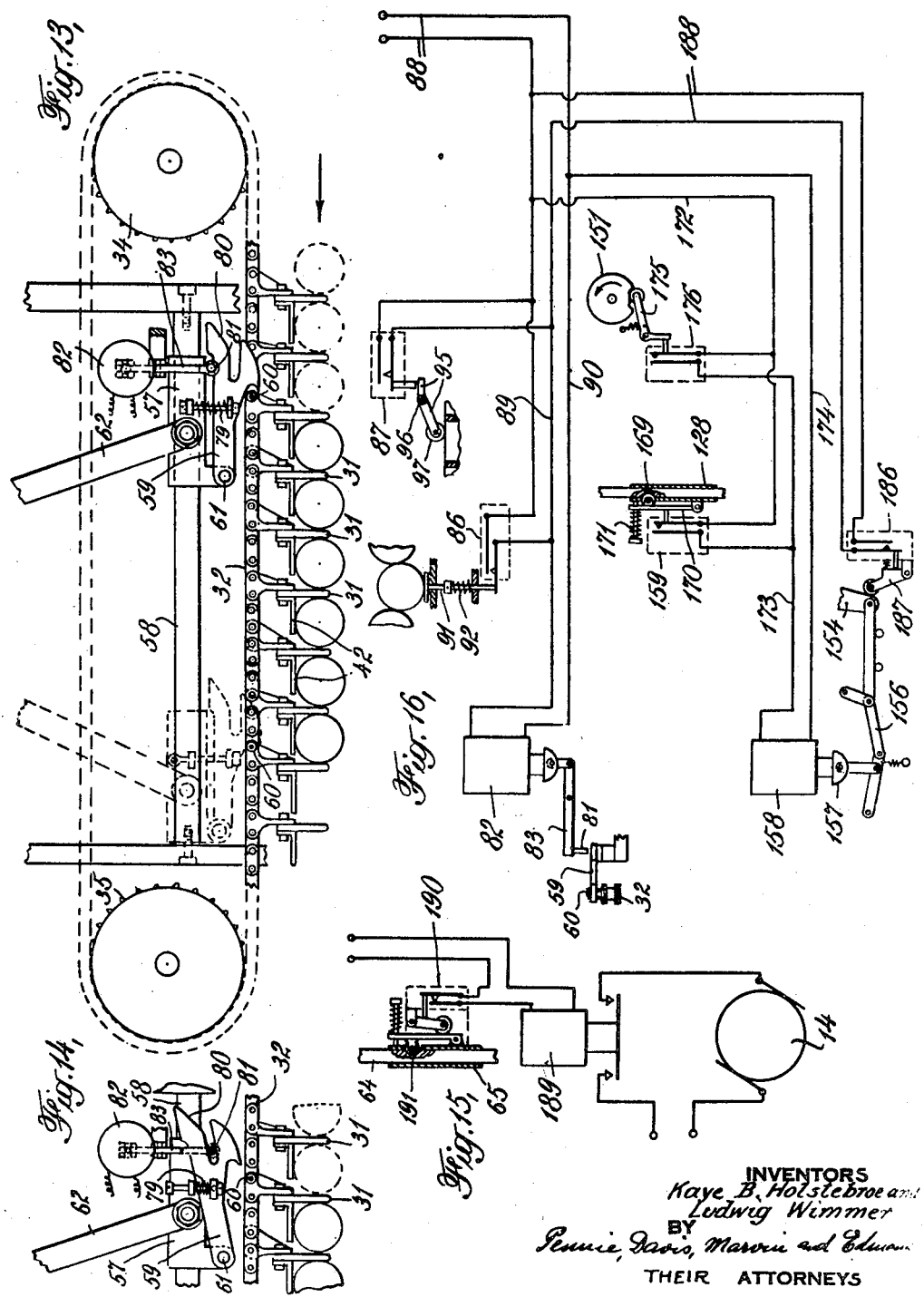
INVENTORS
Kaye B. Holstebroe and
Ludwig Wimmer
BY
Pennie, Davis, Marvin and Edmonds
THEIR ATTORNEYS Patented Oct. 26, 1948

2,452,376

UNITED STATES PATENT OFFICE 2,452,376

BOTTLE PACKING MACHINE

Kaye B. Holstebroe, Gildersleeve, and Ludwig Wimmer, Middletown, Conn., assignors to Standard-Knapp Corporation, Portland, Conn., a corporation of New York Application November 4, 1942, Serial No. 464,444

19 Claims. (Cl. 226—14)

This invention relates to bottle packing machines, that is to say, to machines for placing bottles in shipping cases or trays, and is directed more specifically to machines for packing cell cases or trays in which the bottles are received within individual compartments or cells formed by partitions at right angles to one another.

The invention aims to provide an improved bottle packing machine of this type, and, more especially, to provide a bottle packing machine which is entirely automatic in its operation and does not require the presence of an attendant to look after the machine.

In bottle packing machines as heretofore constructed, the presence of an attendant has been necessary, his duties, among other things, being to see that each case to be filled is properly presented to the depositing or packing mechanism, to clear the machine in the event of a "jam" caused by the improper positioning of one or more bottles in a case, and to remove the filled cases from the machine. The primary object of the present invention is to provide a bottle packing machine which does not require such attention and which therefore can, if desired, be placed in a room, or on a floor of the building, where no other persons are working, the bottles being forwarded to the machine by a conveyor and the filled cases being removed from the machine by another conveyor and carried to some other part of the building, for example, to a lower floor, for storage or shipment.

Another object of the invention is the provision of an improved packing machine of the sort which places the bottles in the case one row at a time.

Another object of the invention is to provide a bottle packing machine which, if a "jam" should occur, is self-clearing and automatically restores itself to normal operation.

In bottle packing machines of this kind which are known as single row cell case packers, considerable difficulty has heretofore been experienced in arranging the bottles of each row in suitably spaced relation to one another so that their insertion in the case may proceed without engagement of the bottles with the case partitions, and the invention also aims to overcome this difficulty.

An embodiment of the invention is illustrated by way of example in the accompanying drawings and the invention will be understood from a consideration of these drawings taken together with the following description, the scope of the invention, however, not being limited to the particular embodiment but being set forth in the appended claims.

In the embodiment of the invention illustrated the machine is arranged to place well known beverage bottles in wooden trays having both lonitudinal and cross partitions forming the cells for the individual bottles. These trays are of less height than the bottles and are used in the distribution of the product to the retail trade. It will be understood, however, that the apparatus of the invention may be employed for filling shipping cases of greater height than the bottles and constructed of any suitable material, and also that the trays illustrated may be made of any suitable material.

In these drawings:

Fig. 7a (on the same sheet with Fig. 8) is a fragmentary vertical section taken on the same plane as Fig. 8, namely, line 8—8 of Fig. 1, but with the parts shown in a different position. It is also similar to Fig. 2 but with the parts in a different position.

Fig. 10 is a view also similar to Fig. 8 but with certain parts omitted and showing the remaining parts in a still different position;

Fig. 11 is a perspective view of the main cam shaft and associated parts;

Fig. 12 is a detail showing in plan view certain of the parts illustrated in Figs. 9, 10 and 11;

Fig. 13 is a view illustrating the operation of certain parts of the machine as illustrated in Fig. 1, namely, the driving mechanism of the flight chain for forming the bottles into rows;

Fig. 14 is a fragmentary view showing certain parts of Fig. 13 in a different position; and Figs. 15 and 16 are diagrams of electrical connections.

Figure 1:
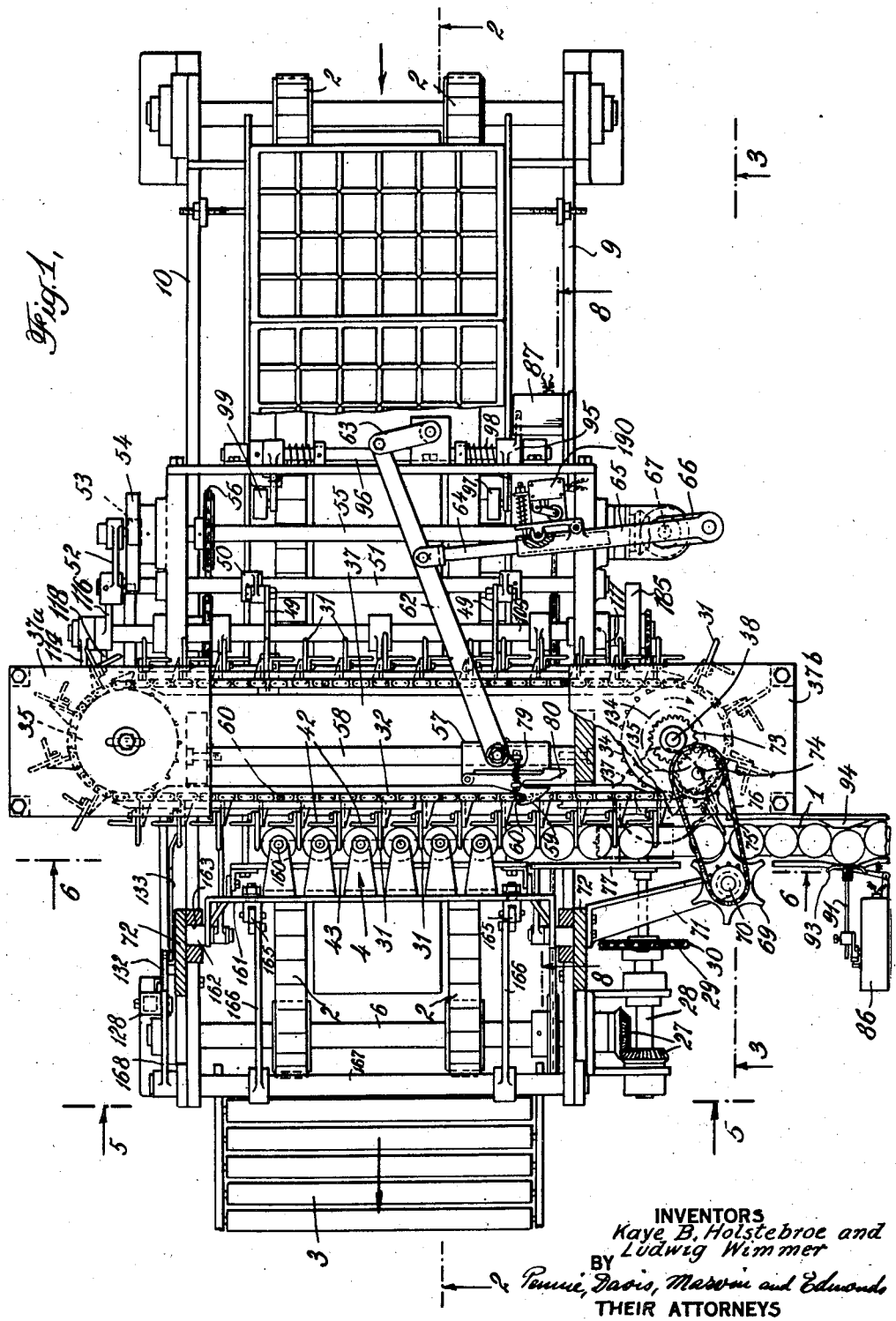
Fig. 1 is a view of the bottle packing machine in horizontal section taken on plane 1—1 of Fig. 3.

Referring now to the accompanying drawings, the bottles to be packed come in from the right hand side of the machine, as viewed in Fig. 1 (the front end of the machine being at the left), on an endless supply conveyor indicated generally by numeral 1. The cell trays are advanced through the machine on a second endless belt conveyor indicated generally by numeral 2 at right angles to the bottle conveyor 1 and moving from the rear of the machine toward the opposite or front end. The trays are supplied to conveyor 2 by means of a supply conveyor, not shown, which may be, for example, of the gravity roller conveyor type, and if desired may come down from a floor above.

The filled trays leaving conveyor 2 at the front end of the machine (at the left in Fig. 1) are received by a delivery conveyor 3 which is shown as being of the roller gravity operated type. This conveyor takes the filled trays to storage which may be on the floor below. An ample and continuous supply of trays is provided on the conveyor which feeds the rear end of conveyor 2, and delivery conveyor 3 is of ample length at the storage end so as not to interfere with the continuous operation of the packing machine. The trays may be removed from the storage conveyor by hand or in any suitable way and placed in tiers or stacks for storage pending shipment.

Figure 5:
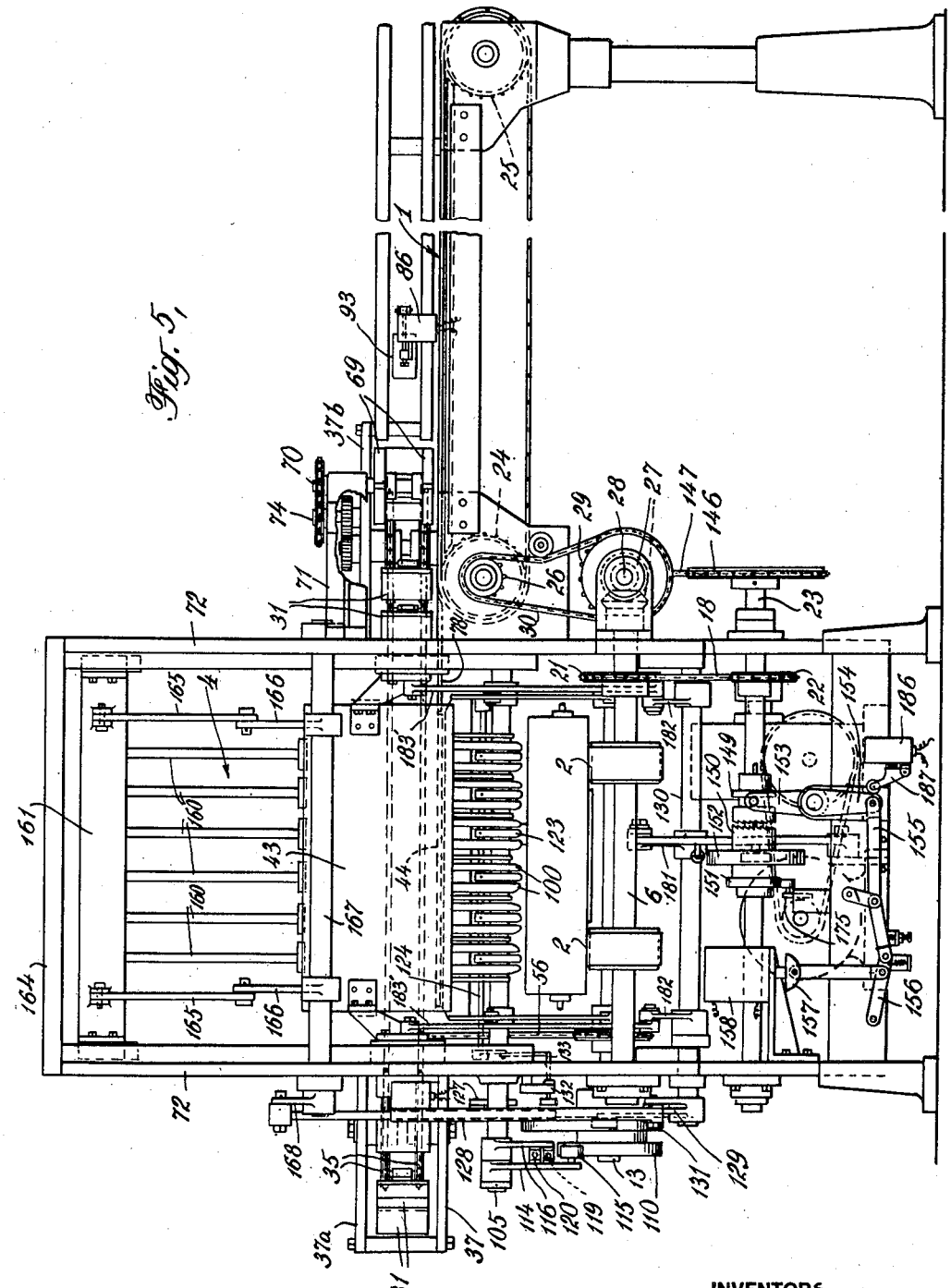
Fig. 5 is an elevation looking at the front end of the machine.

As may be seen in Fig. 5 and in other figures of the drawings the bottle conveyor 1 is above the tray conveyor 2 and delivers the bottles to a depositing mechanism indicated generally by numeral 4 which is in line with conveyor 1. By means of this depositing mechanism the bottles are arranged in rows of six bottles each spaced apart from one another to correspond with the thickness of the tray partitions, such rows being successively formed and deposited by gravity in the respective compartment rows of each case.

The tray conveyor comprises two endless platform chains 2 arranged parallel to one another to support the opposite sides of the trays. Chains 2 are carried by sprockets 5 on a driving shaft 6 at the front end of the machine and by sprockets 7 on an idler shaft 8 at the rear. Shafts 6 and 8 are journaled in horizontal side frame members 9 and 10. Appropriate side guides for the sides of the trays are provided to keep the trays lined up on conveyor chains 2 and in registry with the depositing mechanism 4. Conveyor chains 2 are maintained horizontal by means of two supporting bars 11 (Fig. 3) extending longitudinally of the machine, and a supporting bed or plate 12 (Fig. 6) is provided between the chains for the trays immediately beneath the bottle depositing mechanism.

The bottle depositing mechanism is actuated by a number of cams, most of which are carried on a main cam shaft 13 extending crosswise of the machine between said frame members 9 and 10. The machine is driven by means of an electric motor 14 which through a belt 15 is connected to a speed reducing gear 16. The slow speed shaft of this gear has a main driving sprocket 17 around which main driving chain 18 passes. Following the course of this chain in Fig. 3 it is seen to pass around an idler sprocket 19, thence upwardly around a sprocket 20 which is keyed to main cam shaft 13 just referred to. Chain 18 then passes horizontally to the front end of the machine around a driving sprocket 21 which is keyed to driving shaft 6 (Fig. 7) for the tray conveyor chains 2. Chain 18 then passes around an idler sprocket 22 and returns to driving sprocket 17 on the speed reducing gear 16. Idler sprocket 22 is loose on a cross shaft 23 which is the clearing mechanism operating shaft to be referred to later on.

Bottle chain 1 is supported by a driving sprocket 24 (Fig. 5) and an idler sprocket 25. The shaft on which driving sprocket 24 is mounted has at one end another sprocket 26 which is driven from driving shaft 6 of the tray conveyor through beveled gearing 27, shaft 28, sprocket 29 and chain 30. Through these driving connections both bottle conveyor 1 and tray conveyor 2 are continuously driven by motor 14.

Figure 6:
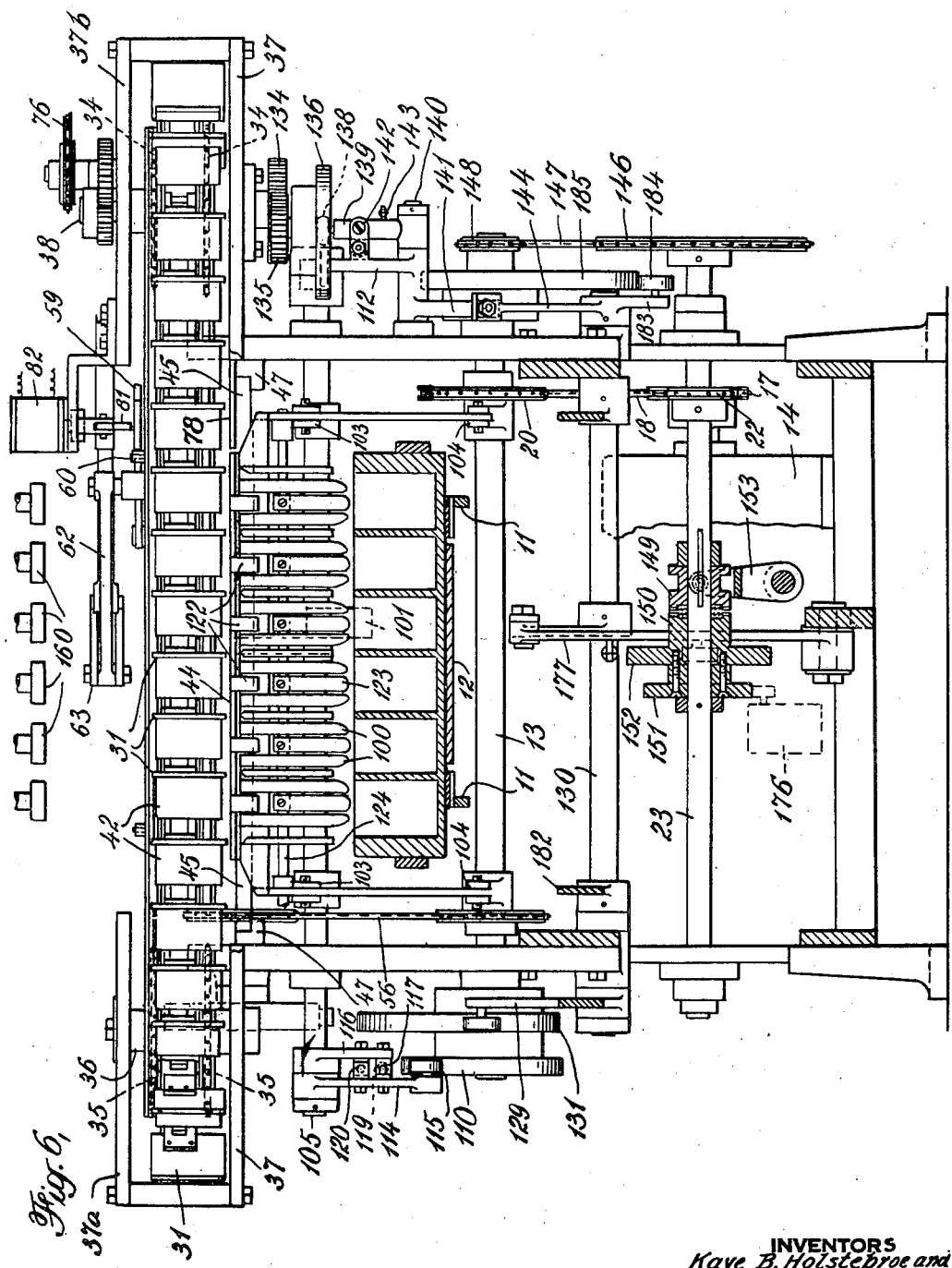
Fig. 6 is a transverse vertical section taken on the line 6—6 of Figs. 1 and 3 looking toward the rear.
Figure 8:
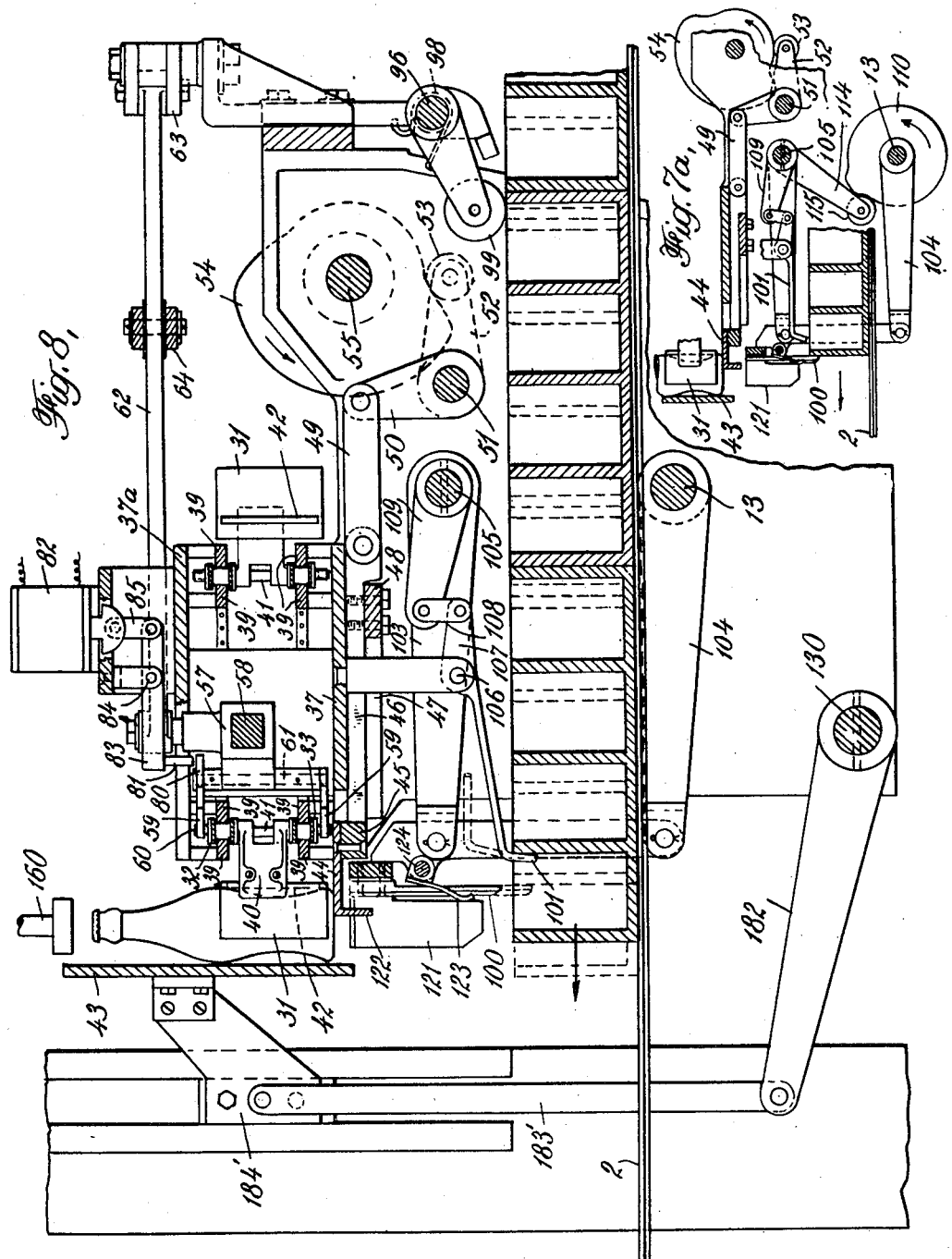
Fig. 8 is a vertical section taken on line 8—8 of Fig. 1 drawn to an enlarged scale.

The bottles are arranged in rows in the depositing mechanism 4 by means of a device comprising a series of equally spaced plates or flights 31 carried by a pair of endless chains 32 and 33 arranged one above the other (Fig. 8). This device as a whole will be referred to as the "flight chain." Chains 32 and 33 of this device are carried by two pairs of sprockets 34 and 35 all of the same diameter. The pair of sprockets 35 are mounted to rotate on an upright stub shaft 36 which is fixed between two horizontal frame plates 37 and 37a on the left hand side of the machine (Figs. 6, 5 and 1). The pair of sprockets 34 are keyed to a short rotatable shaft 38 journaled on the right side of the machine between frame plates 37 and 37b. The purpose of having shaft 38 driven by the flight chain will appear later. Frame plate 37 extends from side to side of the machine whereas plates 37a and 37b are short plates mounted in fixed relation to plate 37 at its opposite ends.

As may be seen from Fig. 8 the two chains 32 and 33 constituting the flight chain are each arranged to move between closely fitting horizontal guide bars 39. These extend between the two pairs of sprockets 34 and 35. These guide bars coact with the rollers of the chains to maintain the plates or flights 31 in vertical position, these flights each being secured to a bracket 40 and each of these brackets being carried on pins 41 (Figs. 8 and 1) extending between the two chains 32 and 33. The base of each bracket 40 is secured to two adjacent pins 41 so as to firmly support flights 31 at right angles to the two chains.

These flight plates 31 have a thickness corresponding to the thickness of the partitions in the trays and hence hold adjacent bottles in properly spaced relation to be received by the tray. In order to position the bottles laterally on the side towards the chains 32 and 33 each of brackets 40 carries a back plate 42 which is mounted at right angles to the flight plates 31. Hence along the straight portions of the flight chain between the two pairs of supporting sprockets 34 and 35, a series of pockets is formed, one between each adjacent pair of flight plates 31. The bottles in these pockets are spaced apart by the thickness of plates 31. By properly controlling the movement and stopping of the flight chain, these plates 31 may be positioned vertically above the tray partitions so that the pockets between the flights will be in registry with the cells or compartments of the row of the case beneath when this case has been fed forward to its receiving position, as will be described below.

The bottles in the row to be deposited in the tray are held in the pockets just referred to by means of a vertically shiftable apron 43 (Figs. 1, 5 and 8) which serves to guide and position the front sides of the six bottles in this row. Apron 43 is shifted downwardly by mechanism to be described until its lower edge rests upon the front wall of the tray or upon one of the cross partitions so as to guide the fronts of the bottles to prevent them from being caught on the upper edges of these members.

The six bottles forming the row are supported on a shutter plate 44, the upper surface of which is at the same level as the top of frame plate 37 and which is arranged to be withdrawn laterally to the right as shown in Fig. 8 to allow the bottles to drop toward the tray at the proper time. Shutter plate 44 is secured to a cross bar 45 (Fig. 8) and at the opposite ends of this bar there are legs 46 which are slidably supported on rabbeted members 47, which are fastened to the lower side of frame plate 37. A rear cross bar 48 (Fig. 8) serves to tie together the rear ends of legs 46.

Figure 2:
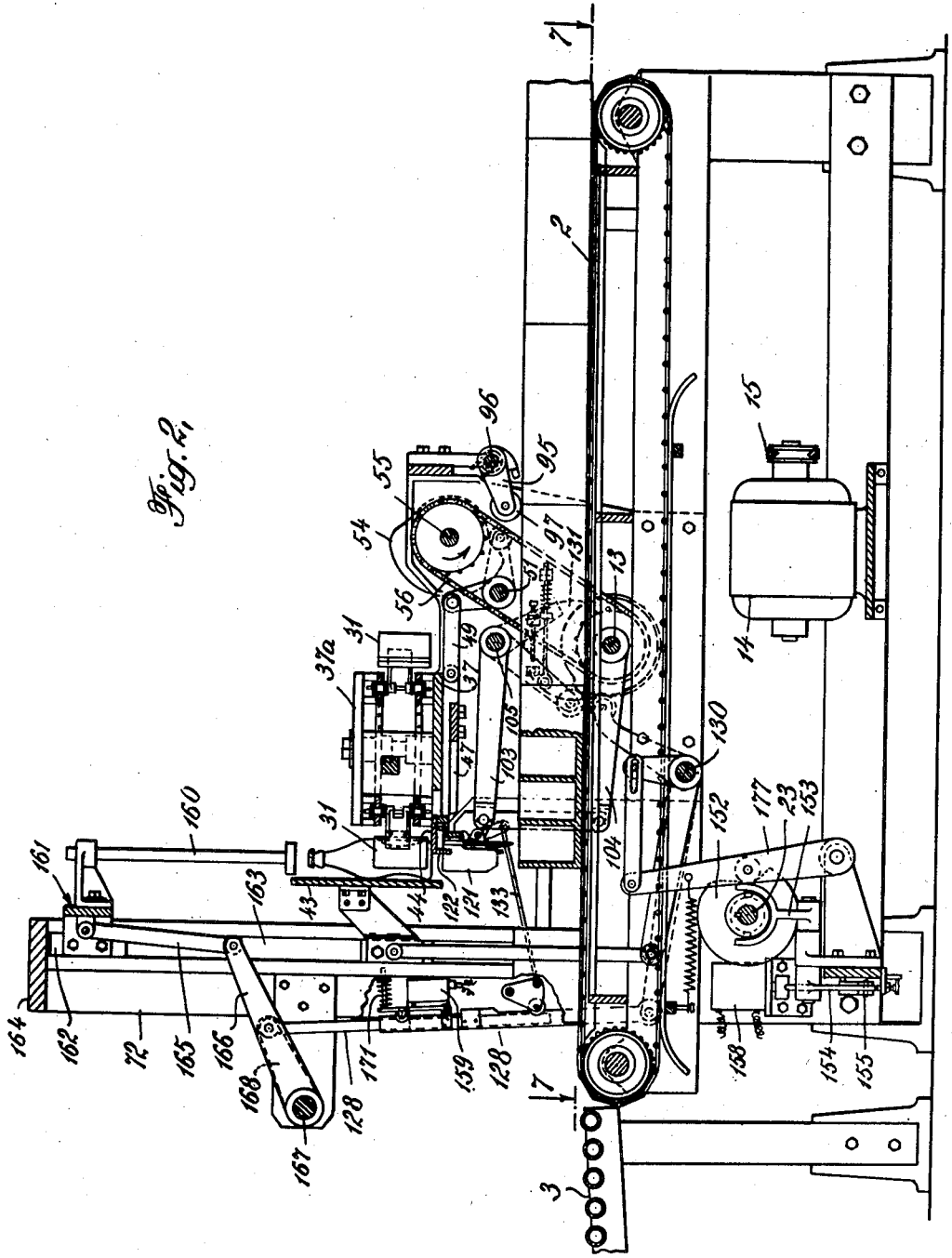
Fig. 2 is a longitudinal section taken on the plane 2—2 of Fig. 1 and looking towards the left side of the machine.

To actuate the shutter plate support just described, links 49 (Figs. 1 and 8) are pivoted to the rear ends of legs 46 and connected to arms 50 which are pinned onto a cross shaft 51. On the left hand end of this shaft there is another arm 52 carrying a roller 53 which engages a cam 54 on another cross shaft 55. This cross shaft is driven from main cam shaft 13 by means of a chain 56 and sprockets of equal size (Fig. 2). Hence shaft 55 rotates continuously at the same speed as main cam shaft 13.

The flight chain (chains 32 and 33) carrying the flight plates 31 is actuated to feed in bottles from the flight conveyor 1 to form successive rows by mechanism which is driven from cross shaft 55. This mechanism consists of a continuously reciprocating carriage 57 which is arranged to travel on a square slide bar 58 mounted above frame plate 37 inside of the flight chain. Carriage 57 has pivoted to it a ratchet mechanism which may connect the carriage with the chain at the commencement of each forward stroke so that the chain may be advanced a distance corresponding to the length of a row of six bottles at each stroke of carriage 57. This ratchet mechanism includes upper and lower ratchets 59 (Fig. 8) which are provided with hook portions to engage roller pins 60 on chains 32 and 33.

These pins on chain 32 extend upwardly and those on chain 33 extend downwardly. They are spaced apart on the two chains a distance corresponding to six bottle pockets. The two ratchet members 59 each have hubs extending respectively above and below carriage 57 and these hubs are pinned as shown in Fig. 8 to a common shaft 61 to cause both ratchets to move in unison so that the lower ratchet 59 can be controlled by movement of the upper ratchet in a manner to be described later on for the purpose of interrupting the advance of the flight chain under certain conditions.

Reciprocating carriage 57 is moved back and forth by means of an actuating arm 62 pivoted at its rear end to a short link 63 which in turn is pivoted to the frame of the machine so as to allow carriage 57 to move in a straight line on its supporting bar 58. Actuating arm 62 is driven by means of a connecting rod 64, 65 which is operated by a crank 66 (Fig. 1) which rotates in a horizontal plane being fixed upon the upper end of a short vertical shaft 67 which rotates in a bracket secured to the left side of the machine and is driven through beveled gearing 68 from continuously rotating cross shaft 55.

Figure 3:
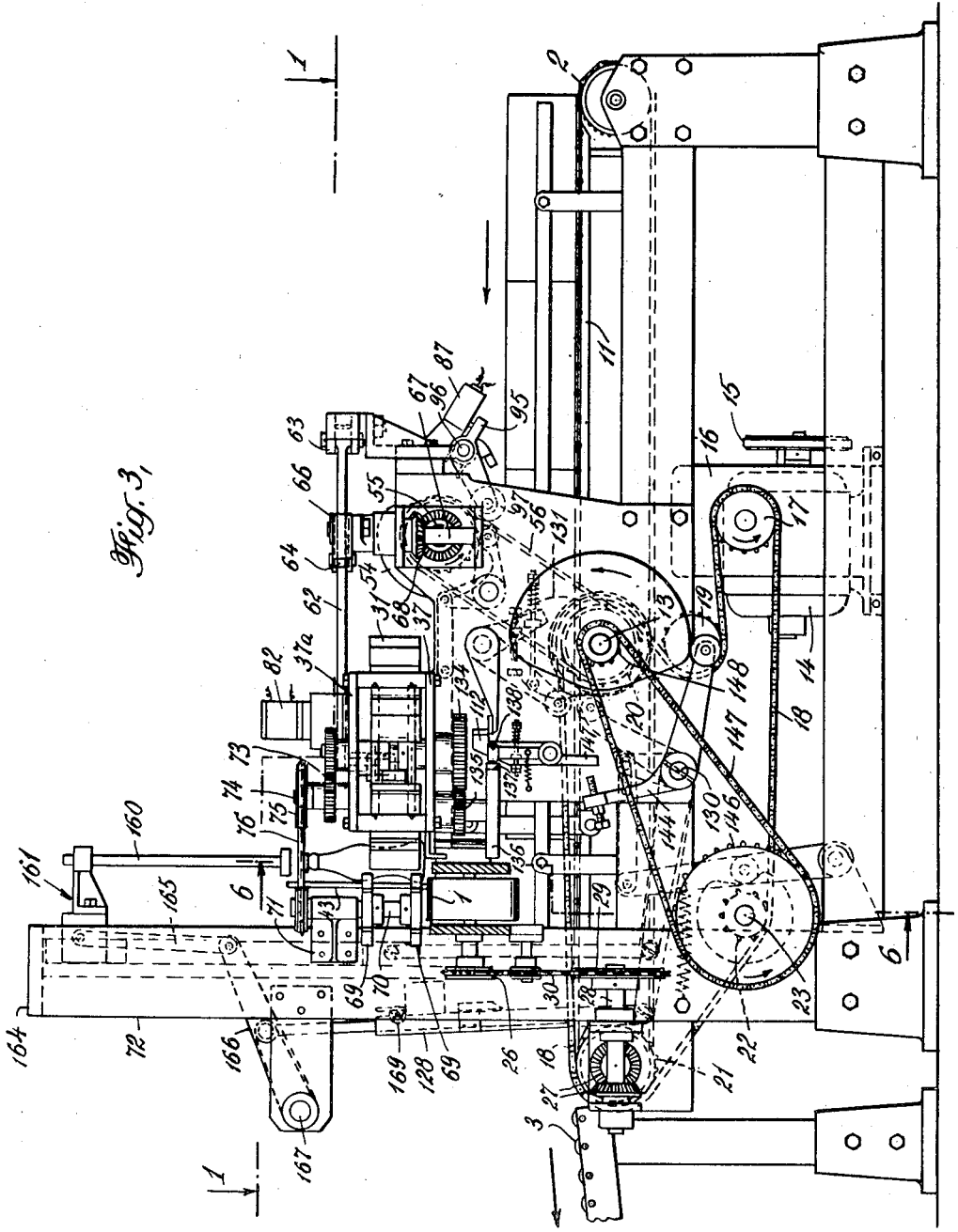
Fig. 3 is a side elevation looking from the right hand side of the machine as illustrated in Fig. 1.

The bottles arrive at the packing machine on supply conveyor 1 and are to be spaced apart to correspond with the thickness of the cell-case partitions, and arranged in rows. The mechanism of the present machine simultaneously spaces the bottles apart and advances them in spaced relation and in single row formation from conveyor 1 to a discharge position immediately above the cell-case. To assist in causing the bottles from conveyor 1 to enter each of the spaces between adjacent pairs of flight plates 31, a star wheel 69 is provided (Figs. 1 and 3). This star wheel comprises upper and lower sections as shown in Figs. 3 and 5 having their hubs pinned to a vertical shaft 70 which is supported for rotation at the outer end of a bracket 71 (Fig. 5). Bracket 71 is secured to one of two upright posts 72 one on each side of the machine. Shaft 70 is interconnected with shaft 38 of sprockets 34 at the right hand end of the flight chain.

For this purpose a pair of spur gears 73 are used in order to obtain the correct direction of rotation of the star wheel, one of these gears being fixed to the upper end of shaft 38 and the other rotating on a short stationary shaft 74 which extends upwardly from frame plate 37a. Also rotating on shaft 74 just above gear 73 and connected thereto there is a sprocket 75 which through a chain 76 drives a sprocket on the upper end of shaft 70.

In this way, whenever the flight chain (chains 32 and 33) is advanced from right to left in Fig. 1 by the reciprocation of ratchet carriage 57, the teeth of the star wheel 69 are rotated in timed relation with the movement of the ends of the flight plates 31 as shown in Fig. 1. The bottles are continuously fed forward by the continuously driven conveyor chain 1, the end of which is to the left of the star wheel 69 as shown in Fig. 5. Hence the bottles are continuously urged into the respective pockets of star wheel 69 and as the teeth of the star wheel rotate they force themselves between adjacent bottles and separate them from one another, as shown in Fig. 1, by a distance which is at least equal to the thickness of flight plates 31. The edges of these plates present themselves successively opposite the ends of the star wheel teeth and maintain the separation of adjacent bottles which has been effected by the star wheel.

Conveyor belt 1 continues to feed the bottles forward as shown in Figs. 5 and 1 until the flight plates 31 have rounded sprockets 34 and come into parallel relationship with one another. From this point on the bottles are advanced by the flight chain pockets formed by plates 31 and the other parts previously described. The bottles are guided at their front sides by means of a stationary plate 77 (Fig. 1) which is in alinement with apron 43 until they reach the apron. The bottles are supported on a scuff plate 78 (Fig. 5) after they pass from conveyor chain 1 until they reach the shutter plate 44.

In order to control the advance of the flight chain by reciprocating ratchet carriage 57, the solenoid mechanism and connected parts shown particularly in Figs. 13, 14 and 8 is provided. It will be remembered that both the lower and upper ratchets 59 are pinned to their pivot shaft 61 so that the movement of the lower ratchet can be controlled by that of the upper. Upper ratchet 59 is provided with a compression spring 79 which biases the two ratchets to cause their hooks to engage pins 60 on flight chains 32 and 33. On the back stroke of carrier 57, therefore, the hooks of ratchets 59 will snap over pins 60 under the biasing action of spring 79 unless this engagement is prevented.

So as to retract ratchets 59 to prevent their engagement with pins 60 when it is desired to allow flight chains 32 and 33 to remain stationary, the head of the upper ratchet 59 is provided with a cam surface 80. Cam 80 is engaged by a vertically shiftable pin 81 (Fig. 8) when this pin is shifted to its lower position by the energization of solenoid coil 82. Pin 81 projects downwardly from the left hand end of a lever 83 which is pivoted at 84 and connected to the solenoid plunger through the link 85. When solenoid 82 is deenergized pin 81 is in its upper position shown in Fig. 8 and is out of the path of the upper latch 59. In Fig. 14 pin 81 has been shifted downwardly by the energizing of coil 82 into the path of latch 59, and cam surface 80 of this member has engaged pin 81 which has resulted in swinging both latch members 59 away from the flight chains, preventing the hooks of the ratchets from picking up the chain pins 60. So long as solenoid 82 is energized this action will occur at the end of each back stroke of carriage 57 and consequently the flight chains 32 and 33 will remain stationary.

In the operation of the row-forming mechanism driving carriage 57 reciprocates continuously with a smoothly accelerating and decelerating motion imparted from the crank 66, and since the driving connection with the flight chain is made by ratchets 59 at the commencement of the forward stroke of the driving carriage, the flight plates and the bottles between them are smoothly accelerated and then smoothly decelerated to the end of the stroke of carriage 57 at which position the flight plates are in vertical alignment with the guide chutes (to be later described) and with the cells of the case into which the bottles are to be deposited. This contributes to the smooth, quiet and rapid operation of the machine.

One of the conditions under which it is desired to leave flight chains 32 and 33 stationary is upon the failure of the supply of bottles on conveyor 1; another is upon the failure of the supply of empty cases on conveyor 2. Devices are provided for energizing solenoid 82 under either of these conditions.

Referring to the circuit diagram (Fig. 16) a switch 86 controlled by the bottles and a switch 87 controlled by the cases are provided. Current from one of the supply conductors 88 is led through the contacts of switches 87 and 86 in parallel to a conductor 89 which is connected to one terminal of solenoid 82. The other terminal is connected through conductor 90 to the other supply conductor 88. Closure of the contacts of either switch 86 or 87, therefore, causes solenoid 82 to be energized but both of these switches must be open in order to have solenoid 82 deenergized.

The arrangement is such that so long as the line of bottles on conveyor 1 is maintained and the line of cases on conveyor 2 is maintained the contacts of both switches 86 and 87 are held open, but should either supply line fail, one switch or the other will be closed, thereby energizing solenoid 82 and preventing the advance of flight chains 32 and 33.

The contacts of bottle-actuated switch 86 are separated by means of an actuating rod 91 which is biased toward the row of bottles by a helical spring 92. Rod 91 is provided with a shoe 93 (Fig. 1) which engages a single bottle which is shifted laterally of the line of bottles on conveyor 1 by means of a cam guide block 94. Cam block 94 serves to shift the bottle opposite it out of the line and this bottle is then squeezed farther out by the pressure of the bottles immediately in front and behind it.

The contacts of case operated switch 87 are normally biased to open position and are closed by means of a lever 95 (Fig. 1) which is pivoted loosely on a stationary cross shaft 96 arranged immediately above the trays (Fig. 2). At its opposite end lever 95 carries a roller 97 which engages the top right hand side edges of the trays as they move beneath it. A helical spring 98 biases roller 97 downwardly against the cases. Spring biased lever 95 serves not only to actuate the contacts of switch 87 but also to hold the cases firmly in position on the platform conveyor chains 2. A second similar spring biased roller arm 99 is provided on the left hand end of cross shaft 96 to hold down the left sides of the cases.

Figure 9:
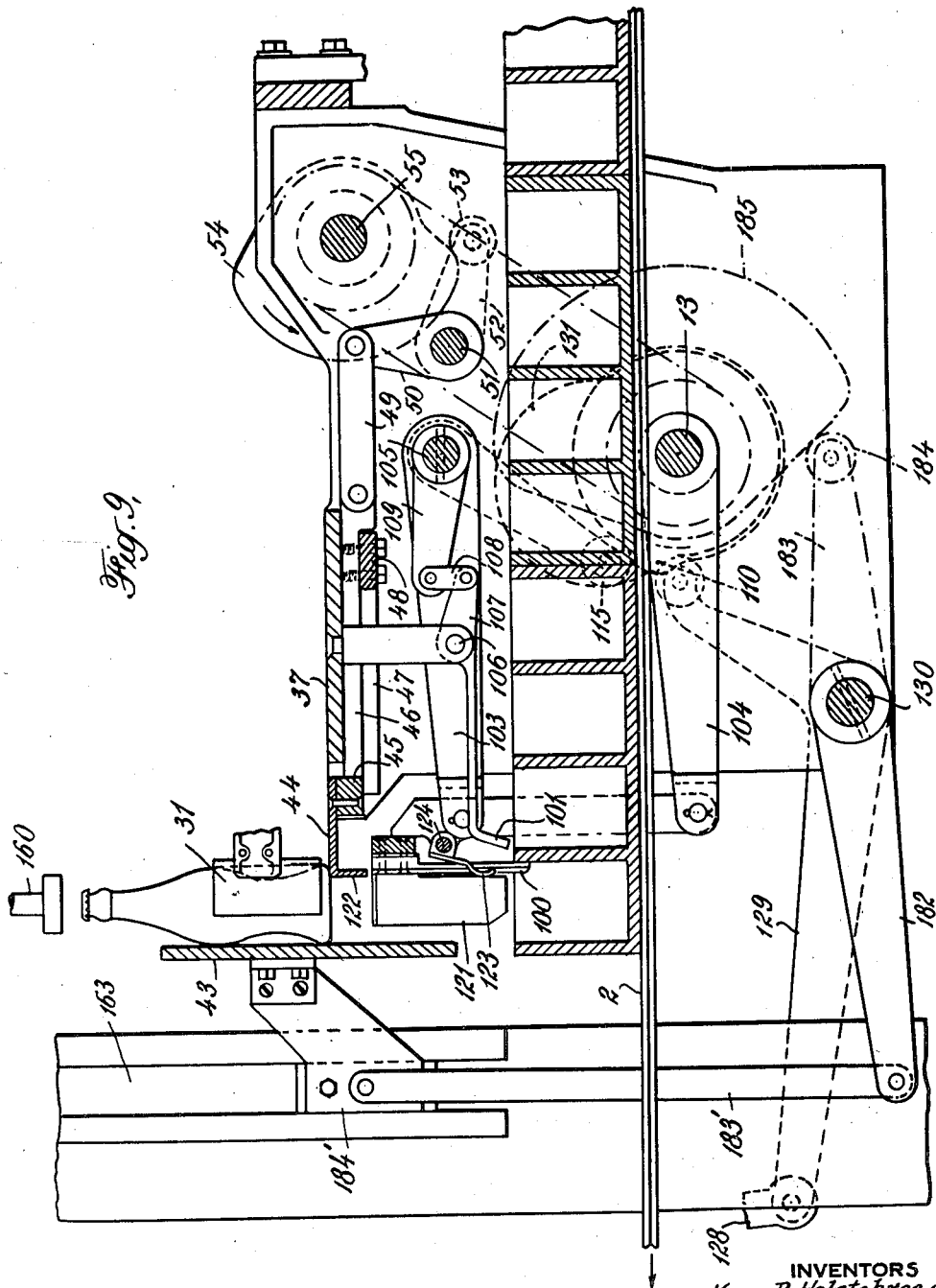
Fig. 9 is a view similar to Fig. 8 but showing the parts in a different position.

The advance of the cases from the rear of the machine toward the front, that is to say, from right to left in Figs. 8 and 9, for example, in a step-by-step movement is controlled by means of an escapement mechanism shown more particularly in Figs. 7a, 8, 9 and 10. This mechanism causes the cases to be advanced one row at a time and has alternately shiftable fingers 100 and 101. These two sets of fingers are so interconnected that when one set is shifted upwardly the other is simultaneously shifted downwardly after the manner of an escapement mechanism. The set of fingers 100 comprises a pair of rigid fingers for each bottle compartment of the row to be packed (Figs. 12, 11 and 9). Fingers 100 are maintained always vertical by means of a parallel motion mechanism. For this purpose these fingers are mounted upon a vertically movable carrier 102 (Fig. 11). Carrier 102 has at each end verticle legs which are pivoted to two sets of equal length supporting arms 103 and 104. The lower arms 104 are pivoted loosely on rotating main cam shaft 13. Arms 103 above are pinned to an actuating rock shaft 105 which is parallel to shaft 13 and pivoted in the frame of the machine vertically above it.

Finger 101 of the escapement mechanism is pivoted at 106 to a fixed part of the machine and is actuated by extension 107 at the rear of pivot 106 which is connected through link 108 to a short arm 109 on the forward side of rock shaft 105. By this mechanism when shaft 105 is rocked in one direction, fingers 100 move downwardly and finger 101 moves upwardly, and vice versa, when shaft 105 is rocked in the opposite direction.

Rock shaft 105 is actuated by a cam 110 at the left hand end of main cam shaft 13 but is permitted to move only when lever 111 is released by a latch arm 112 which is pivoted on a fixed shaft 140 (Fig. 11) so as to be shiftable into and out of engagement with the front end of lever 111. This latching mechanism will be described in further detail later.

Because of the latching of rock shaft 105 against movement, as just described, the arm 114 (which has a roller 115 engaged by escapement actuating cam 110) is mounted loosely on rock shaft 105 and its motion is transmitted thereto by a yieldable connection illustrated in Fig. 11 and in other figures. This yieldable mechanism comprises a second arm 116 which is pinned to shaft 105 adjacent arm 114 and which has a lug 117 projecting from one side of it. A rod 118 is pivoted at one end to arm 114 and passes through an aperture in lug 117 being provided with a head at its other end, and between this head and lug 117 there is a helical compression spring 119. An adjustable stop screw 120 is mounted in a second lug projecting from the side of arm 116 and is adapted to engage a lug on the side of arm 114. In the position of the parts shown in Fig. 11, latch 112 is in engagement with arm 111 so that rock shaft 105 is held against movement and since roller 115 has been pushed outwardly by the hump on cam 110, spring 119 is under compression and the lug on arm 114 has been moved away from the end of stop screw 120.

By this arrangement, rock shaft 105 and the escapement mechanism and other parts actuated by the rock shaft are moved only at such times as it is desired to move them and cam shaft 13 is allowed to rotate continuously.

Fingers 100 function not only as part of the escapement mechanism to control the feeding of the tray, but also to guide the bottles into their respective cells (Fig. 12). The separation of individual bottles by the flight plates 31 of the flight chain is maintained as the bottles descend into the tray by means of vertical guide plates 121 also mounted on carrier 102. These plates, therefore, move up and down with the carrier under the control of latch 112 and cam 110.

As has been explained, the front sides of the bottles are guided downwardly into their cells by apron 43. Tongues 122 (Figs. 8 and 6) which project downwardly from shutter plate 44 serve to guide the rear sides of the bottles as they commence their descent.

The sequence of operation in feeding a tray into position to receive a row of bottles and causing the row to be deposited in the tray cells is illustrated in Figs. 7a, 9 and 10. The drag of the continuously moving conveyor chains 2 urges the trays to the left and the foremost tray is stopped by the engagement of fingers 100 with the front thereof, as shown in Fig. 7a. A row of bottles is in position between flight plates 31 of the flight chain and supported on shutter plate 44. The lobe of cam 110 is about to move roller 115 outwardly, and it will be understood that latch 112 has been actuated by mechanism to be described to release arm 111 so that the outward movement of roller 115 will cause the rocking of shaft 105.

In Fig. 8 rock shaft 105 has been rocked by the movement of the hump of cam 110 beneath roller 115 (Figs. 2, 3 and 4) to lift fingers 100 and lower finger 101 (see Fig. 8) and the conveyor has carried the case forward until the front of the first partition has engaged the rear of finger 101, thus arresting the movement of the case.

In Fig. 9 cam 110 and shutter plate cam 54 have rotated a slight distance farther, the lobe of cam 110 just passing from beneath roller 115. This has caused the position of the escapement fingers 100 and 101 to be restored to their former position, resulting in the advance of the case to bottle-receiving position with its front row of cells accurately positioned beneath the row of bottles on shutter plate 44.

This feeding movement is comparatively short, as may be seen from the dotted position of Fig. 8 which corresponds with the full line position of Fig. 9. The front of the first partition wall has advanced from contact with finger 101 to contact with fingers 100.

In Fig. 9 shutter plate cam 54, through the operating mechanism previously described, had withdrawn shutter plate 44 to a point where it is just about ready to release the row of bottles. In Fig. 10 the movement of the shutter plate has been completed, the bottles have been released and have been received within their respective cells in the first row of the tray.

As the respective bottles descend they strike a series of yieldable fingers 123 (Figs. 9 and 11) which are pinned upon a light shaft or rod 124 extending from end to end of the carrier 102 and pivoted thereon. At its right hand end rod 124 has a short arm 125 pivoted to it and a helical spring 126, one end of which is fastened to this arm and the other end to the machine frame, tends to rock rod 124 in a direction to press fingers 123 against the bottles. These fingers slow somewhat the fall of the bottles into their respective compartments and the resistance offered by these yieldable fingers may be too great for the weight of a bottle and prevent it from reaching its correct position in the tray. Therefore, shortly after the bottles have come into contact with fingers 123 the fingers are shifted to the position shown in Fig. 10 to release the bottles. This shifting is accomplished by means of a cam 127 carried on a vertical rod 128 which is raised by means of a lever 129 pivoted loosely on the left hand end of another cross shaft 130 and which is actuated by means of a cam 131 which is fixed upon main cam shaft 13 adjacent cam 110. Cam 127 engages a bell crank 132 which is connected by means of a rod 133 to an arm 134 on the left hand end of rod 124 which carries fingers 123.

By means of mechanism described above, provision has been made to prevent the advance of flight chains 32 and 33 should there be a failure in the supply of bottles. In that event it is also important to prevent the feeding forward of the tray unless there is a row of bottles in position in the flight chain ready to be deposited in the tray. Otherwise the tray might be fed forward out of the machine with one or more rows empty. This is the reason for the control of rock shaft 105 by latch 112. The latch is operated to release rock shaft 105 for operation by cam 110, thereby causing a case to be fed forward by the escapement fingers 100 and 101, by the following mechanism.

Beneath frame plate 37 and secured on the lower end of shaft 38 of the flight chain sprockets 34, there is a gear 134 (Figs. 6, 3 and 1). This gear meshes with another gear 135. Gear 135 rotates a cam 136 immediately below it on a shaft extending downwardly from frame plate 37. This is a circular cam aside from a short depression 137 shown in dotted lines in Figs. 1 and 3.

Cooperating with the outside surface of cam 136 is a roller 138 shown also in Fig. 11. Roller 138 is carried on the end of an arm 139 which is pivoted loosely on a shaft 140 fixed to the right hand side of the machine frame (Figs. 6 and 3). Alongside of arm 139 on shaft 140 is pivoted the latching arm 112. The hub of arm 112 has a downward extension 141 which will be referred to later on.

Arm 139 carrying roller 138 is arranged to actuate latching arm 112 through engagement with the end of a stop screw 142 (Fig. 11) on arm 112. Whenever the roller 138 is received within the depression 137 of cam 136, a helical spring 143 causes it to move latching arm 112 to the left as shown in Fig. 11, so as to release arm 111. Latching arm 112 can also be released by the engagement of an actuating arm 144 with extension 141 even though roller 138 is not in depression 137, the necessary rocking of arms 112 and 141 being permitted through a yieldable connection between arms 139 and 112 afforded by means of helical spring 145.

The gearing 134 and 135 is so arranged as to cause one complete revolution of cam 136 for each advance in flight chains 32, 33 of a distance equal to the length of a row of six bottles. In other words, cam 136 is rotated one complete revolution for each stroke of ratchet carrier 57 so long as the ratchets are permitted to engage their cooperating pins 60 on the chains.

The angular position of depression 137 with cam 136 is such that just before the end of the stroke of carriage 57, ratchets 59 being in engagement with the flight chains, that is, just before the carriage reaches the dotted position of Fig. 13, roller 138 enters the depression 137 and effects the release of lever 111 by latch 112. However, by the time carriage 57 reaches the dotted position shown in Fig. 13, roller 138 has reached the end of depression 137 and again been forced outwardly. This causes the compression of the spring 145 if the face of latch 112 still remains in contact with the end of lever 111, that is, if the latch is still in released position. In this way, therefore, rock shaft 105 is released at the end of each stroke of ratchet carriage 57 which brings a line of bottles into depositing position so as to permit cam 110 to actuate the escapement fingers 100 and 101 to cause the case to be fed forward to receive such row of bottles.

It occasionally happens that the partitions forming the bottle cells or compartments in the cases become warped, or otherwise out of place, so that a bottle will be prevented from being seated on the bottom of its cell. Under these conditions the top of the bottle will not be level with the rest of the bottles in the tray or in the row, and may strike the lower edge of the apron 44 as the tray is fed forward the next time. Such a dislocation of a bottle may cause a serious jamming of the mechanism of the machine and arrangements have been provided in the present apparatus to clear the machine in the case of such a bottle jam.

Figure 7:
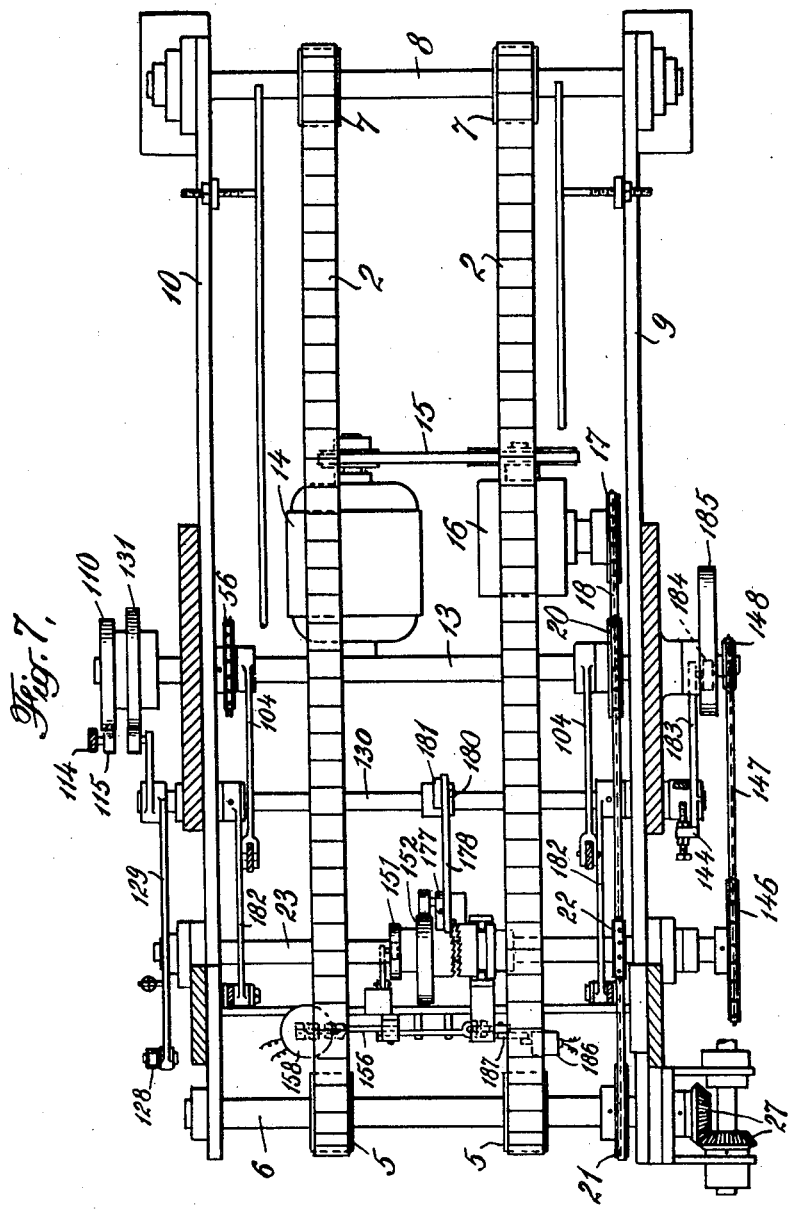
Fig. 7 is a horizontal section taken on the line 7—7 of Fig. 2 showing particularly the driving mechanism.

This clearing mechanism constitutes the remainder of the machine to be described. Near the front end of the machine, as viewed in Fig. 2, is the operating shaft 23 of this clearing mechanism. This shaft is continuously rotated by means of a sprocket 146, a chain 147 and a sprocket 148 on the right hand end of main cam shaft 13 (Figs. 7 and 3). Sprockets 148 and 146 are of a size to cause shaft 13 to make four revolutions for each one revolution of shaft 23.

At about the center of shaft 23 (Figs. 5 and 6) there is a one-revolution clutch and cam mechanism. This comprises a laterally shiftable jaw clutch member 149 which is keyed to shaft 23 and therefore rotates continuously, but is slidable thereon. This clutch member has teeth which are adapted to engage the teeth of a second clutch member 150 when member 149 is shifted to the left as shown in Figs. 5 and 6. Clutch member 150 has secured to it two cams 151 and 152, and all three of these members are loose on shaft 23.

Clutch member 149 is shifted by means of a fork member 153 which is rocked by an arm 154 actuated by a link 155 and a toggle mechanism 156. This toggle mechanism is in turn actuated by the plunger 157 of a solenoid 158.

Figure 4:
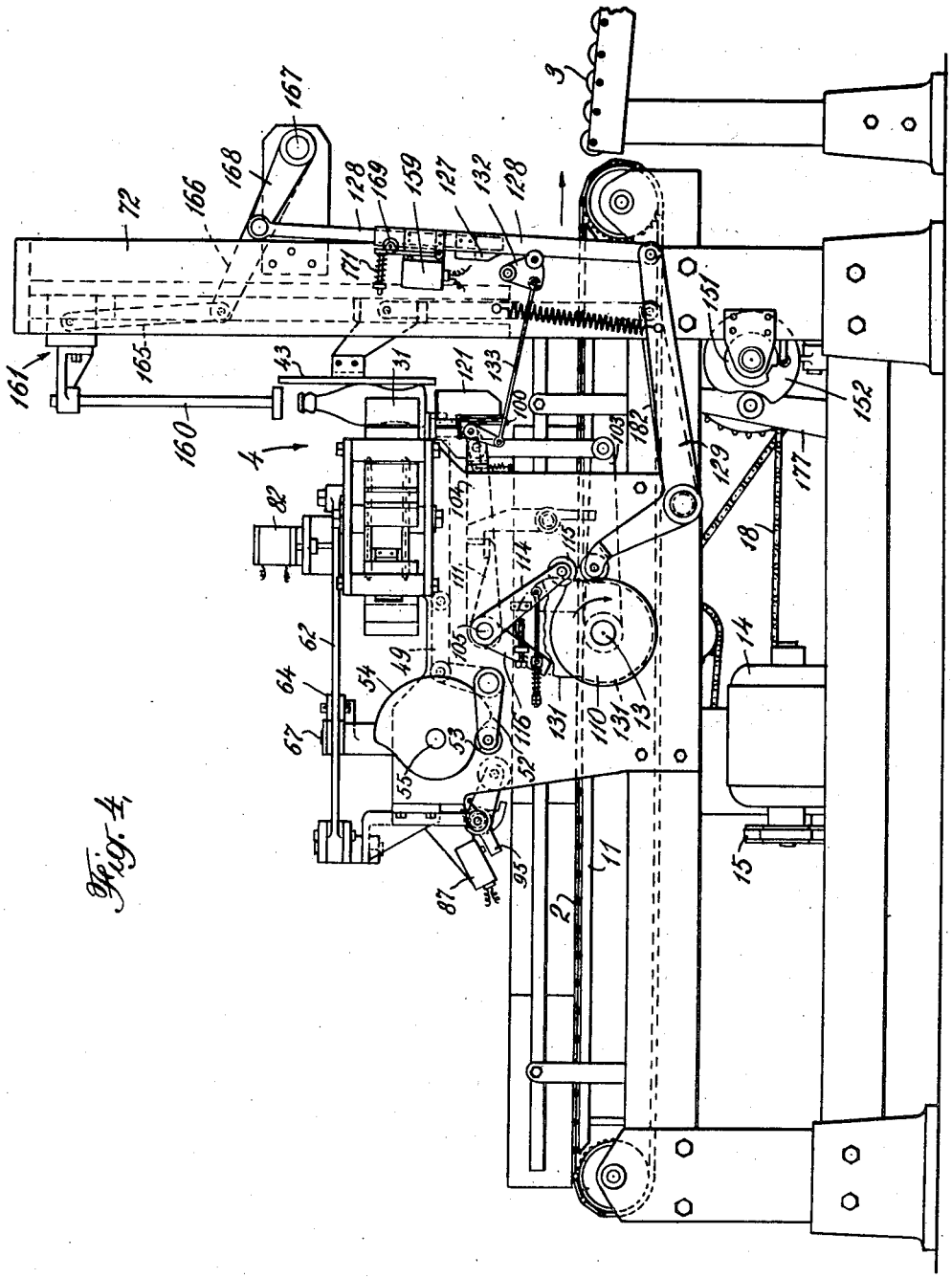
Fig. 4 is a similar view looking from the left side of the machine.

An electrical circuit through solenoid 158 is closed by means of a detector switch 159 (Figs. 16, 2 and 4). Detector switch 159 is mounted upon rod 128 which actuates the detector mechanism. This mechanism comprises a series of detectors 160 which are arranged above the tops of the bottles in the row being deposited and follow the bottles down as they drop into the case. These detectors are mounted upon a carriage 161 having at each end guide blocks 162 which are arranged to slide in guideways 163 provided on the inside of each of posts 72. These guideways are closed at the top by a cross member 164 which ties together the upper ends of posts 72.

Carriage 161 carrying detectors 160 is raised and lowered by means of links 165 (Fig. 5) pivoted at their lower ends to a pair of arms 166 which are fixed upon a shaft 167 pivoted for rocking movement in posts 72. The left hand end of shaft 167 has secured to it an arm 168 to which the upper end of rod 128 is pivoted.

Rod 128, as previously described, is reciprocated vertically by means of cam 131 and arm 129. This rod 128, as shown in Figs. 2 and 16, is made in two telescoping sections, the upper section being received within the lower section. These two sections slide readily within one another and are yieldably held against such movement by means of a roller 169 which is mounted upon a member 170 which is pivoted at its lower end to the outer section of rod 128. Roller 169 is positioned in a slot or opening in this outer section and engages a rounded depression in the inner section of rod 128. The roller is urged into engagement with this depression by means of a helical spring 171.

The rotation of cam shaft 13 and cam 131 causes the vertical reciprocation of detectors 160 through the mechanism just described, the detectors following the bottles downwardly but not engaging the bottles under the normal operation of the apparatus, that is to say, so long as the bottles continue to be correctly positioned in the cells of the tray. Should a bottle, however, because of a warped partition, or otherwise, be incorrectly positioned and be prevented from descending onto the bottom of the tray, the top of such bottle would be engaged by one of the detectors 160. This would cause a greater thrust than usual in the actuating rod 128 which would result in the upper portion of this rod being withdrawn somewhat from its lower portion. This will force roller 169 out of its rounded depression. This causes the compression of spring 171 and the closing of the contacts of detector switch 159.

As shown in Fig. 16, the closing of these contacts completes a circuit from one of the supply conductors 88 through a conductor 172 to the switch contacts and thence through a conductor 173 to the coil of solenoid 158. The return conductor 174 from this coil is connected to the other supply conductor 88.

The closing of the contacts of detector switch 159 in this manner and the energization of solenoid 158 causes the engagement of jaw clutch member 149 with member 150, as previously described. Therefore member 150 and cams 151 and 152 commence to rotate. On the first part of the rotation of cam 151 (Fig. 16) the actuating arm 175 of a holding switch 176 is moved outwardly, closing the contacts of this switch. These switch contacts close a holding circuit from conductor 172 to conductor 173 around the contacts of switch 159 and maintain the circuit of solenoid 158 closed after the resetting of switch 159 to its original position.

This resetting occurs automatically on the next rotation of cam shaft 13 which causes carriage 161 for detectors 160 to be raised above its usual elevation on account of the elongation of actuating rod 128 which took place when the engagement of one of the detectors with the incorrectly positioned bottle occurred. Carriage 161 will be raised until it strikes cross member 164, thus preventing the further upward movement of the carriage and also of the upper portion of actuating rod 128 which will be re-telescoped into the lower portion until roller 169 is again received within the rounded depression and the contacts of switch 159 will thus be re-opened. Also the lower ends of detectors 160 will be restored to their correct position to continue their operation.

Solenoid 158 continues to be energized until cams 151 and 152 have made one complete revolution, at which time the actuating arm 175 of holding switch 176 will be moved inwardly, its roller re-entering the depression of cam 151. This opens the contacts of switch 176, deenergizing solenoid 158. Its plunger 157 drops, causing the shifting of arm 154 to disengage clutch members 149 and 150.

This does not occur, however, until several events have happened. One of these is to lift apron 43 higher than usual so as to allow the dislocated bottle to pass beneath it. This is caused by the rotation of cam 152, which forces lever 177 (Figs. 2 and 11) to the right together with a link 178. This link at its right hand end is provided with a slot 179 in which is a pin 180 on a short arm 181 which is fixed to shaft 130.

But first, as to the usual or normal operation of apron 43: Shaft 130 is provided with a pair of arms 182 fixed thereto and connected at their outer ends to links 183' (Fig. 9) which are connected at their upper ends with sliding brackets 184' to which apron 43 is secured at its opposite ends (Figs. 5 and 8). Shaft 130 is rocked by means of an arm 183 which is pinned thereto at its right hand end and which has a roller 184 operating in engagement with the peripheral edge of an apron operating cam 185 fixed to shaft 13.

So long as there are no incorrectly positioned bottles in the machine, cam 185 causes the apron 43 to be lowered and raised in timed relation to the descent of the bottles into the tray, the lower edge of the apron being in contact with the top of the tray when the bottles enter. The apron is raised by cam 185 a sufficient distance to permit the tops of the bottles to clear the bottom of the apron when they are resting on the bottom of the tray in proper position. During this normal oscillation of shaft 130 the pin 180 moves idly back and forth in slot 179 of link 178 of the machine clearing mechanism.

Returning now to the operation of this clearing mechanism, the description had progressed to the point where cam 152 was forcing link 178 to the right, as shown in Fig. 11. This causes the left hand end of slot 179 to engage pin 180 and move arm 181, thus rocking shaft 130. The arrangement is such that the movement which occurs in this manner turns shaft 130 through a greater angle than it is turned by cam 185. Roller 184 moves away from this cam, and apron 43 is raised to a sufficient extent so that even if the dislocated bottle is standing upright on the top of the tray instead of on the bottom, the tray and bottle can be moved beneath the apron by the feeding mechanism.

Another event to happen when the one revolution clutch solenoid 158 is energized, and the first event in the point of time, is the closing of the contacts of a switch 186 (Figs. 5 and 16) whose operating arm 187 is actuated by the movement of the arm 154 which causes the engagement of the clutch (Figs. 5 and 16). The closing of this switch 186 completes a circuit through conductors 188 which connects one of the supply conductors 88 with conductor 89 and thereby energizes solenoid 82 which causes ratchets 59 to be retracted at the end of the back stroke of carriage 57, as shown in Fig. 14, thereby preventing the movement of flight chains 32 and 33. The effect of the closing of switch 186, therefore, is to hold the flight chains stationary until the end of the clearing mechanism cycle of operation, that is to say, during four complete reciprocations of carriage 57. In this way the feeding of bottles to the depositing mechanism is prevented during these four reciprocations.

The rocking of shaft 130 by cam 152 also performs another function. This is the release of latch 112 from arm 111 of the rock shaft 105 (Fig. 11) so as to permit the operation of the case feeding mechanism. This is accomplished by arm 141 on shaft 130 striking the lower end of arm 141 projecting downwardly from the latching arm 112. This releases arm 111, spring 145 being compressed during this releasing movement.

This causes latch 112 to be held in released position until the end of the clearing mechanism operating cycle, during which time cam shaft 13 makes four complete revolutions and cam 110 causes the rocking of shaft 105 four successive times and this actuates the escapement fingers 100 and 101 a corresponding number of times to permit four successive advances of the cases by case conveyor 2.

If the incorrectly positioned bottle happens to be in the first row of a case, this feeding movement will cause that case to be moved forward beyond the depositing mechanism and the first row of the next case to be advanced ready to receive bottles. Should the dislocated bottle be in any of the rows after the first, the operation of the clearing mechanism will result in two cases going forward onto the discharge conveyor only partially filled with bottles. The case with the warped partitions causing the dislocation of the bottle will be removed at the storage room, and the following tray which may be undamaged will have its full complement of bottles completed by hand filling.

It will be understood that as soon as the operating cycle of the clearing mechanism has been completed the packing machine continues its normal operation.

The operating circuit of the driving motor 14 is controlled by an electromagnetic switch 189. The operating circuit of this switch has the usual push button control, not shown, and includes the contacts of a switch 190 (Figs. 15 and 1). This switch is mounted on the connecting rod 64, 65 which drives the actuating arm 62 of carriage 57 which drives the flight chain.

The two portions 64 and 65 of this connecting rod are telescoped within one another and are held in operative position by means of a spring pressed roller 191 mounted on member 65 and engaging a depression in the side of member 64. In other words, this mechanism is similar to the mechanism for operating switch 159 which is mounted on rod 128. Should bottles in any manner become jammed as they feed into the flight chain or during their advance to dropping position by the flight chain, so as to raise the driving force exerted by connecting rods 64, 65 above a predetermined value, the two telescoping parts 64 and 65 will shift relative to each other, thereby opening the switch contacts 190 which will result in stopping the driving motor 14.

Although our invention has been described as embodied in a machine for packing bottles it will be understood that it can also be used for packing cans or other similar articles. Accordingly, the term "bottle" as used in the appended claims is intended to include other articles such as those just mentioned.

In our improved bottle packing apparatus we have provided a machine which is quiet, rapid and automatic in operation. It will be understood, however, that changes may be made in the arrangement and construction of the apparatus as herein described, as well as in the details of such apparatus, without departing from our invention, the scope of which is indicated in the appended claims.

We claim:

1. In apparatus of the class described, mechanism for depositing rows of bottles successively in each of a series of successive cases, step-by-step mechanism for feeding the cases successively past the depositing mechanism to receive the bottles, and clearing mechanism operative in response to incorrect positioning of a bottle in a case to interrupt the operation of the depositing mechanism and to cause the case feeding mechanism to remove the partly filled case beyond the depositing mechanism.

2. In apparatus of the class described, mechanism for depositing bottles one row at a time in cases, step-by-step operating mechanism for advancing the cases one row at a time past the depositing mechanism to receive the bottles, and clearing mechanism operative in response to incorrect positioning of a bottle in a case to interrupt the operation of the depositing mechanism and to cause the case feeding mechanism to operate a predetermined number of times while the operation of the depositing mechanism is interrupted.

3. In apparatus of the class described, mechanism for depositing bottles one row at a time in cell cases, mechanism for feeding the cases to said depositing mechanism one row at a time to receive the bottles, an apron in alignment with one of the cell case cross partitions to guide the bottles, and clearing mechanism operative in response to the incorrect positioning of a bottle in a case to interrupt the operation of the depositing mechanism and to cause the case feeding mechanism to operate to a predetermined extent to remove the partly filled case from the depositing mechanism, said clearing mechanism including means to move the apron to permit the case carrying the incorrectly positioned bottle to pass the same.

4. In apparatus of the class described, mechanism for depositing bottles one row at a time in cell cases, mechanism for feeding the cases to said depositing mechanism one row at a time to receive the bottles, an apron in alignment with one of the cell case cross partitions to guide the bottles, and clearing mechanism operative in response to the incorrect positioning of a bottle in a case to interrupt the operation of the depositing mechanism and to cause the case feeding mechanism to operate to a predetermined extent to remove the partly filled case from the depositing mechanism, said clearing mechanism including means to elevate the apron to permit the case carrying the incorrectly positioned bottle to pass beneath it.

5. In apparatus of the class described, mechanism for depositing bottles one row at a time in cell cases, mechanism for feeding the cases to said depositing mechanism one row at a time to receive the bottles, an apron in alignment with one of the cell case cross partitions to guide the bottles, means for lifting the apron after each row is deposited to allow the said row to advance beneath it, and clearing mechanism operative in response to the incorrect positioning of a bottle in a case to interrupt the operation of the depositing mechanism and to cause the case feeding mechanism to operate to a predetermined extent to remove the partly filled case, said clearing mechanism including means to elevate the apron higher than it is moved by said lifting means to permit the case carrying the incorrectly positioned bottle to pass beneath it.

6. In apparatus of the class described, mechanism for depositing bottles one row at a time in cases, step-by-step operating mechanism for advancing the cases one row at a time past the depositing mechanism to receive the bottles, and clearing mechanism operative in response to incorrect positioning of a bottle in a case to interrupt the operation of the depositing mechanism and to cause the case feeding mechanism to operate a predetermined number of times while the operation of the depositing mechanism is interrupted, said clearing mechanism including means for automatically restoring the apparatus to bottle packing operation upon completion of the said predetermined number of operations of the case feeding mechanism.

7. In apparatus for placing bottles in cell cases, a plurality of chutes for directing the individual bottles into their respective cells, mechanism above the chutes for supporting the bottles and releasing them into the upper ends of said chutes to cause them to move by gravity through the same into the case, a finger associated with each chute resiliently biased to act as a friction brake against the side of the bottle passing therethrough and means for automatically retracting the said finger to insure the passage of the bottle through the chute.

8. In apparatus for placing bottles in cell cases, a plurality of chutes for directing the individual bottles into their respective cells, mechanism above the chutes for supporting the bottles and releasing them into the upper ends of said chutes to cause them to move by gravity through the same into the case, a finger associated with each chute spring biased to act as a friction brake against the side of bottle passing therethrough to slow its movement, and mechanically operated means operating in timed relation to said bottle releasing means to retract the said finger after it is struck by the bottle.

9. In apparatus for placing bottles in cell cases a row of chutes for directing a plurality of bottles into their individual cells, mechanism above the chutes for supporting the bottles and releasing them into the upper ends of said chutes to cause the bottles to move by gravity through the same into the cell case, a finger associated with each chute, common supporting means for said fingers, mechanism actuating the supporting means resiliently to bias said fingers to act as friction brakes against the sides of the respective bottles so as to cause them to slow their downward movement, and mechanically operated means for actuating said finger supporting means simultaneously to retract said fingers after they are struck by the bottles.

10. In apparatus of the class described, mechanism for depositing bottles one row at a time in cases, mechanism for feeding the cases past the depositing mechanism to receive the bottles, clearing mechanism to operate when a bottle is incorrectly positioned in the case to interrupt the operation of the depositing mechanism and to cause the case feeding mechanism to move the partly filled case beyond the depositing mechanism, and automatically resettable detector mechanism for detecting a bottle incorrectly positioned in the case for causing the operation of said clearing mechanism.

11. In apparatus of the class described, row-forming mechanism for segregating bottles from a supply into rows to be dropped into a case one row at a time, guide chute means for receiving the bottles from the row-forming mechanism and directing them into the case, case feeding mechanism for advancing the cases step-by-step one row at a time beneath the guide chute means, automatically resettable detector mechanism for detecting a bottle incorrectly positioned in the case, and mechanism having a predetermined cycle of operation initiated by said detector mechanism, said cycle including temporary stopping of the row-forming mechanism and causing continuance of operation of the case-feeding mechanism for a predetermined number of steps to feed the case beyond the guide chute means while preventing depositing of bottles therein until the end of the cycle.

12. In apparatus of the class described, row-forming mechanism for segregating bottles from a supply into rows to be dropped into a case one row at a time, guide chute means for receiving the bottles from the row-forming mechanism and directing them into the case, case feeding mechanism for advancing the cases step-by-step one row at a time beneath the guide chute means, an apron coacting with the guide chute means for directing the bottles into the case, means for lifting the apron after the deposit of each row of bottles to permit the bottles to move beneath it, automatically resettable detector mechanism for detecting a bottle incorrectly positioned in the case, mechanism having a predetermined cycle of operation initiated by said detector mechanism, said cycle including temporary stopping of the row-forming mechanism, raising the apron higher than it is lifted by said lifting means to permit the incorrectly positioned bottle to move beneath it and causing continuance of operation of the case-feeding mechanism for a predetermined number of steps to feed the case beyond the guide chute means while preventing the depositing of bottles therein until the end of the cycle.

13. In apparatus of the class described, mechanism for depositing bottles by gravity one row at a time in cases, mechanism for feeding the cases past the depositing mechanism to receive the bottles, clearing mechanism to operate when a bottle is incorrectly positioned in the case to interrupt the operation of the depositing mechanism and to cause the case feeding mechanism to move the partly filled case beyond the depositing mechanism, detector means for detecting an incorrectly positioned bottle comprising vertically reciprocating detector members arranged to follow the descent of each bottle, driving mechanism for reciprocating the detectors including a yieldable connection to permit the arrest of a detector by an incorrectly positioned bottle, means actuated by said yieldable connection to cause the operation of said clearing mechanism, and means operated by the reciprocation of said detectors to reset said yieldable connection to permit the continued operation of the apparatus after removal of said partly filled case.

14. In apparatus of the class described, row-forming mechanism for segregating bottles from a supply into rows to be dropped into a case one row at a time, guide chute means for receiving the bottles from the row-forming mechanism and directing them into the case, case feeding mechanism for advancing the cases step-by-step one row at a time beneath the guide chute means, mechanism having a predetermined cycle of operation including temporary stopping of the row-forming mechanism and causing continuance of operation of the case-feeding mechanism for a predetermined number of steps to feed the case beyond the guide chute means while preventing the depositing of bottles therein until the end of the cycle, and detector means for detecting a bottle incorrectly positioned in the case comprising vertically reciprocating detector members arranged to follow the descent of each bottle, driving mechanism for reciprocating the detectors including a yieldable connection to permit the arrest of a detector by an incorrectly positioned bottle, and mechanism actuated by said yieldable connection to initiate the operation of the said cycle mechanism.

15. In apparatus of the class described, mechanism for depositing bottles by gravity one row at a time in cases, mechanism for feeding the cases past the depositing mechanism one row at a time to receive the bottles, clearing mechanism to operate when a bottle is incorrectly positioned in the case to interrupt the operation of the depositing mechanism and to cause the case feeding mechanism to remove the partly filled case beyond the depositing mechanism, detector means for detecting an incorrectly positioned bottle comprising vertically reciprocating detector members arranged to follow the descent of each bottle, driving mechanism for reciprocating the detectors including a yieldable connection to permit the arrest of a detector by an incorrectly positioned bottle, and means actuated by said yieldable connection to cause the operation of said clearing mechanism.

16. In apparatus of the class described, mechanism for depositing bottles one row at a time in cases, mechanism for feeding the cases past the depositing mechanism to receive the bottles, clearing mechanism to operate when a bottle is incorrectly positioned in the case to interrupt the operation of the depositing mechanism and to cause the case feeding mechanism to move the partly filled case beyond the depositing mechanism, and detector mechanism for detecting a bottle incorrectly positioned in the case for causing the operation of said clearing mechanism.

17. In apparatus of the class described, row-forming mechanism for segregating bottles from a supply into rows to be dropped into a case one row at a time, guide chute means for receiving the bottles from the row-forming mechanism and directing them into the case, case feeding mechanism for advancing the cases step-by-step one row at a time beneath the guide chute means, detector mechanism for detecting a bottle incorrectly positioned in the case, and mechanism having a predetermined cycle of operation initiated by said detector mechanism, said cycle including temporary stopping of the row-forming mechanism and causing continuance of operation of the case-feeding mechanism for a predetermined number of steps to feed the case beyond the guide chute means while preventing depositing of bottles therein until the end of the cycle.

18. In apparatus of the class described, means for supporting a cell-case to receive bottles one row at a time, a row of guide chutes having walls for guiding individual bottles, said chutes being disposed above said case to guide a row of bottles into the case, an endless chain having flights projecting laterally therefrom spaced apart by the diameter of the bottles and arranged to travel above said guide chutes, a shutter plate above said chutes and below said flights for supporting the bottles between said flights, a reciprocating carriage whose stroke corresponds to the length of said row of guide chutes, a connecting device on said carriage to drive said chain on selected forward strokes of said carriage to advance bottles over said guide chutes to form a row, the end of each such stroke positioning the flight plates in vertical alignment with the walls of said chutes, and means for actuating said shutter plate to release the bottles of said row into said chutes.

19. In apparatus of the class described, depositing mechanism for depositing rows of bottles in a case, a continuously operating conveyor which slides beneath the cases when they are not in motion arranged to feed the cases to the depositing mechanism, an escapement device to control the movement of the case by the conveyor, a continuously operating bottle supply conveyor, a row-forming conveyor for segregating a row of bottles from the supply conveyor and moving them to the depositing mechanism, continuously reciprocating driving mechanism for said row-forming conveyor, means for reciprocating said mechanism with smoothly accelerating and decelerating motion, and intermittently actuated connecting means operating at the beginning of the forward stroke of said driving mechanism for connecting said driving mechanism to said row-forming conveyor to operate the same intermittently to form the bottle rows.

KAYE B. HOLSTEBROE.
LUDWIG WIMMER.

REFERENCES CITED

The following references are of record in the file of this patent:

UNITED STATES PATENTS

| Number | Name | Date |
|---|---|---|
| Re. 21,288 | Novotny | Dec. 5, 1939 |
| 1,090,855 | Jagenburg | Mar. 24, 1914 |
| 1,118,425 | Johnson | Nov. 24, 1914 |
| 1,209,801 | Beckett | Dec. 26, 1916 |
| 1,247,722 | Robers et al. | Nov. 27, 1917 |
| 1,405,102 | Couk | Jan. 31, 1922 |
| 1,412,226 | Anderson | Apr. 11, 1922 |
| 1,452,843 | Nordstrom | Apr. 24, 1923 |
| 1,531,040 | Steimer | Mar. 24, 1925 |
| 1,611,822 | Dulche | Dec. 21, 1926 |
| 1,679,402 | Brown | Aug. 7, 1928 |
| 1,718,443 | Straight | June 25, 1929 |
| 1,843,453 | Littlefield | Feb. 2, 1932 |
| 1,896,639 | Meyer et al. | Feb. 7, 1933 |
| 1,913,001 | Ross | June 6, 1933 |
| 2,067,301 | Miller, Sr. | Jan. 12, 1937 |
| 2,119,767 | Anderson | June 7, 1938 |
| 2,229,348 | Shurley | Jan. 21, 1941 |
| 2,318,498 | Davis | May 11, 1943 |
| 2,318,927 | Davis | May 11, 1943 |
| 2,319,167 | Stewart | May 11, 1943 |
| 2,341,705 | Fedorchak et al. | Feb. 15, 1944 |